FIG. I

INVENTORS:
PATRICK S. COPPOLA
RICHARD M. PERRY
JOHN E. RINDE

BY *Francis K. Richwine*

ATTORNEY

United States Patent Office 3,505,929
Patented Apr. 14, 1970

3,505,929
REDUNDANT FLIGHT CONTROL SERVOACTUATOR
Patrick Steve Coppola, Binghamton, Richard Mark Perry, Johnson City, and John Elmer Rinde, Endicott, N.Y., assignors to General Electric Company, a corporation of New York
Filed Apr. 16, 1968, Ser. No. 721,818
Int. Cl. F01b 25/26; F15b 11/16, 15/26
U.S. Cl. 91—1     10 Claims

ABSTRACT OF THE DISCLOSURE

A redundant servoactuator for a redundant flight control system which will correct for two consecutive failures and which on the third failure will center lock the mechanism. The servoactuator is electro-hydraulic and includes three electro-hydraulic actuator channels arranged in parallel and an electronic comparator and logic circuit. One of the three electro-hydraulic actuator channels has a positive drive connection with an output yoke whereas the other two initially are in an active monitoring condition and take over in predetermined order on failure of the first channel. The electronic comparator and logic circuit operates from comparisons of electric signals indicating the position of the channel drive members, inactivates failed channels, retains information as to channel failures, and in those instances in which the controlling channel fails, passes control to another channel. Determination of failure is based on majority voting, and for this reason the system includes as a fourth channel an electronic actuator model which receives actual command inputs but generates a theoretical response rather than a sensed value for the comparators.

---

The invention described and claimed in this patent was made in the course of a contract with the Department of the Air Force.

Automatic flight controls since the advent of a trend toward "fly by wire" systems for high performance aircraft have included varying amounts of redundancy. The redundancy may occur in particular components, as for example, attitude sensors, computer, actuator servos or power actuators, or for that matter, entire systems. Selection as to combinations requires a balance among factors such as size and weight and the values of varying degrees of redundancy. Present systems generally provide for correction for only one failure by isolation of the failed channel. Although other systems may use the concept of an active standby channel ready to assume control, they have not maintained one or more actively monitoring channel with as much current information as our standby channels and are, therefore not as quick in assuming control in a "fail" situation. Other systems generally use pressure voting or flow voting in hydraulic systems and generally complicated mechanical-hydraulic arrangements using hydraulic logic which cause problems of size and weight and possibly of check-out procedures. Our novel arrangement of a servoactuator for an automatic flight control system is directed toward providing a redundancy that will take corrective action for a plurality of failures and gain the highest possible redundancy for weight and space used. This is accomplished by using electrical control of hydraulic actuators, the use of a completely "electronic model" channel and electronic logic. This invention can be used solely for redundancy in servo controls for power actuators, or with each channel in a separate channel of the overall flight control system can provide redundancy and failure correction for the entire system and is specifically useable in a triply redundant flight control system. The servoactuator can be used either in a "fly by wire" or in a "pseudo fly by wire" system. In the latter instance, control at the time of a third failure would pass to the parallel reserve mechanical or hydraulic system.

Figure 1:
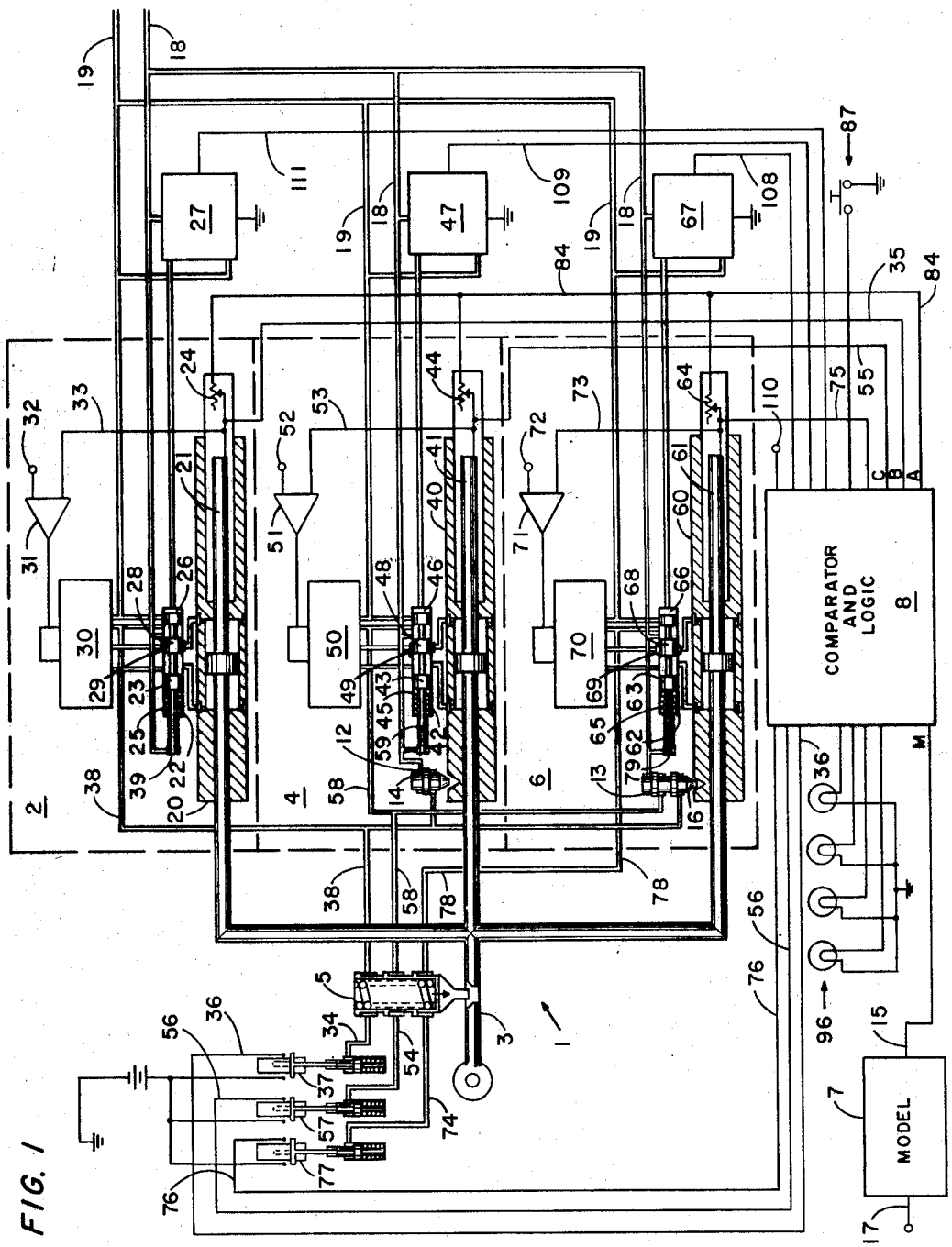
Figure 2:
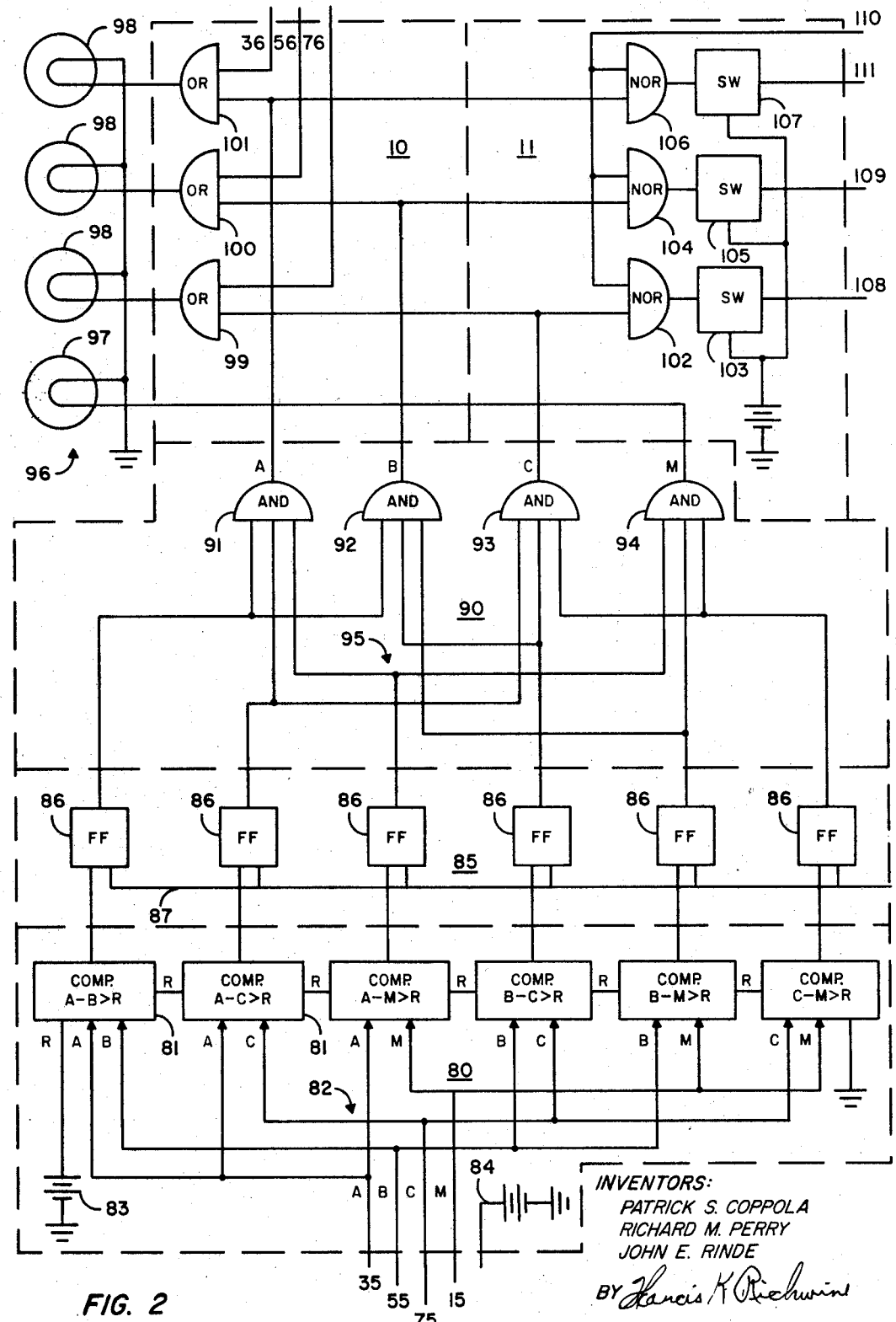

In the accompanying drawings:
FIG. 1 is a schematic of the invention with the hydraulic portions of the system shown in detail.
FIG. 2 is a detailed schematic of the electronic comparator and logic circuitry of FIG. 1.

As set out in FIG. 1, the servoactuator is made up of an actuator mechanism 1, three substantially identical electro-hydraulic actuators 2, 4 and 6, an actuator yoke or lever 3, center lock mechanism 5, an electronic actuator model 7, and an electronic comparator and logic 8.

Each electro-hydraulic actuator 2, 4, 6 includes a hydraulic actuator valve 20, 40, 60 which is a two chambered hydraulic motor with a piston and rod 21, 41, 61 fixed to the actuator yoke 3 at one end and to a position indicating potentiometer 24, 44, 64 at the other. Each hydraulic actuator valve is controlled by a hydraulic supply valve 22, 42, 62 containing a hydraulically operated supply valve spool 23, 43, 63 and an electrically operated servo valve 30, 50, 70 which in each channel jointly gate flow between the actuator valve and hydraulic supply and return conduits 18 and 19 through several local conduits. Supply valve spool 23, 43, 63 is biased by spool spring 25, 45, 65 toward the right as viewed in FIG. 1 to a position in which center land 28, 48, 68 blocks flow of supply pressure hydraulic fluid through valve 22, 42, 62 to preclude its reaching servo valve 30, 50, 70. Activation of the supply valve is accomplished by energizing three-way, two-position solenoid 27, 47, 67 to permit the passage of hydraulic fluid under pressure into start chamber 26, 46, 66 to drive spool 23, 43, 63 to the left against the spring bias. This action then sets the supply valves' valve spool to the position shown in the drawings which permits servo valve 30, 50, 70 to control hydraulic supply and evacuation of the chambers of actuator valve 20, 40, 60 to drive piston 21, 41, 61 to and fro. This is possible because of center channel 29, 49, 69 in the supply line. Deenergizing of the solenoid 27, 47, 67 connects the start chamber to the hydraulic return line permitting spring 22, 42, 62 to drive the valve spool to the right as viewed assisted by hydraulic pressure on the end of the valve spool shaft at 39, 59, 79.

The hydraulic system also includes lock pressure conduit 38, 58, 78 which conveys a supply of hydraulic pressure to the next succeeding channel and to center lock 5. With this arrangement it can be seen that activation of solenoid 27, 47, 67 places supply valve 22, 42, 62 in the condition illustrated in FIG. 1, which places management of actuator valve 20, 40, 60 in the control of servo valve 30, 50, 70 and provides supply pressure to lock pressure conduit 38, 58, 78. Actuator valves 40 and 60 includes sleeve locks 14 and 16 which in their normal position would be set into actuator valve 40 and 60 by pressure from hydraulic supply 18 applied at 12 and 13 to retain them against motion in reaction to hydraulic pressures in either motor chamber. Lock 14 is withdrawn from lock position by pressure in lock pressure conduit 38 which is applied to a larger surface than is the supply pressure at 12. In a similar manner, sleeve lock 16 can be activated by pressure in either lock pressure conduit 38 or 58. Therefore activation of actuator valve 20 with flow of hydraulic fluid at supply pressure into conduit 38 will cause both actuator valves 40 and 60 to be unlocked and therefore to be in a free floating condition with respect to the actuator valve housing. In addition, actuator valve 60 will also be kept in a free floating condition as long as valve 40 is operative and providing hydraulic pressure to conduit 58. These same lock pressure conduits 38 and 58 along with conduit 78 from hydraulic actuator 6 provide hydraulic pressure to center lock 5 which has a spring biased rest position of interlock with actuator yoke 3. Center lock 5 when engaged with actuator yoke 3 serves to place the yoke in a predetermined neutral position as based on the characteristics of the pilot valve of the power ram to which yoke 3 is attached in an operating flight control system.

The relationship described permits valve 20 which is fixed to the actuator chassis to drive yoke 3 with valves 20 and 40 being active but in a free floating condition in which they are not capable of exerting force on yoke 3 unless they move to the extent of the free floating play permitted by the wedge configuration of sleeve locks 14 and 16. Inactivation of solenoid 27 would return supply valve spool 23 to its inactive position in which there is a bypass hydraulic path between the two chambers in valve 20 permitting free motion of piston 21 in the valve. This action relieves valve 20 of control of movement of yoke 3 and simultaneously through relief of pressure in conduit 38 causes sleeve lock 14 to lock thereby passing operational control of yoke 3 to actuator valve 40. A successive inactivation of solenoid 47 would cause valve 40 to assume a bypass condition and pass control to valve 60. Subsequent inactivation of solenoid 67 placing valve 60 in bypass condition would also serve to lock actuator yoke 3 in the predetermined position as determined by center lock 5 as previously explained. This arrangement permits a redundancy in which one active channel is positively attached to operate the actuator yoke and is backed up by two channels in active standby attitude constantly following the movements necessary. Therefore the system can withstand as many as two channel failures with undegraded performance.

Operational control of each channel is by means of an electric command signal applied at 32, 52, 72 to amplifier 31, 51, 71. The command signal is obtained from the aircraft flight control computer located in a central location in the aircraft and would normally include a different control signal for each servoactuator channel 2, 4, 6 although the disclosed redundant servoactuator 1 could be of utility in providing redundancy based on a single command signal from the flight control computer. Use of separate redundant command signals adapts this system to utilization in systems that are triply redundant throughout. Amplifier 31, 51, 71 converts the command signal to one appropriate for operation of servo valve 30. Details of the exact nature of amplifier 31, the signal produced and valve 30 are not provided since they are well within the state of the art. Further control is by means of a linear potentiometer pick-off 24, 44, 64 which provides a signal directly proportional to the displacement between actuator piston 21, 41, 61 and actuator valve 20, 40, 60. This signal is of a suitable nature and magnitude and polarity to permit balancing of it against the command signal when applied to amplifier 31, 51, 71 through feedback loop 33, 53, 73.

Integration of this scheme of redundancy into a flight control system and particularly a "fly by wire" system is best accomplished by use of electrical circuits which will, among other things, detect a failure, remove a failed channel from operation, and pass control to another channel with the minimum time delay. Failure identity is by majority voting. However, majority voting would not permit a three channel system as exemplified by only the three electro-hydraulic servo channels 2, 4, 6, to sustain more than one failure. For this reason, a fourth or dummy channel is added in the form of electronic actuator model 7 which provides a basis for comparison and voting purposes but without direct or driving connection with the actuator yoke. It is the key to a two fault correction system using a minimum, i.e., three channels, of hydraulic servoactuators.

The electronic actuator model 7 also receives a command signal from the flight control computer. With this signal applied at 17 in the same way that the channels 2, 4, 6 receive command signals at 32, 52, 72, the model generates an output signal at 15. Linear potentiometers 24, 44, 64 of channels 2, 4, 6 also produce second signals proportional to displacement which are brought from the pick-offs by leads 35, 55, 75. Since these displacement signals represent the actual amplitude of response of each actuator piston measured with respect to movement within the valve and are easily measurable quantities, the response of the three channels can be compared. The displacement signal generated by model 7 and available at 15 has the nature of a theoretical or desired value representing the normally expected response to the command signal inserted. Model 7 includes, in series, a potentiometer to set the system gain, an amplifier to simulate the servo amplifier 30, an integrator with a limiter in parallel to represent a servo valve with saturable flow, a slew rate potentiometer and another integrator to represent the reaction of the power ram so that the theoretical displacement signal produced is realistic. These four displacement signals, which may for convenience be referred to as displacement signals A, B, C and M, constitute four comparable quantities which can be used as a basis for majority voting so as to permit two failures prior to exhausting its basis for establishing a majority.

Failure detection, channel comparison, selection, and selection implementation are effected by the electronic comparator and logic 8 as shown in the schematic diagram in FIG. 2. Comparator and logic 8 can be regarded as containing a comparator stage 80, made up of six identical comparators 81, memory stage 85 made up of six identical flip-flop circuits, a set, reset and engage circuit 87, a voter 90, comprised principally of four AND gates and indicator and turn off logic 10 and 11 which include respectively, three OR gates, 99, 100, 101, and three NOR gates 102, 104, 106.

Comparator 80 receives displacement signals A, B, C, M through leads 35, 55, 75, 15 and by the wire network 82 applies these displacement signals in mutually exclusive pairs to the six comparators 81, which are distinguishable by the displacement signals received. The comparators 81 are also provided with a standard signal or reference threshold voltage R from a source 83 which represents an amount by which displacement signals can differ from each other without indicating a failure or a sufficient trouble to be regarded as a failure. As a practical matter, R can be established in the range of .1 and .2 of the maximum displacement signal voltage encountered. Comparators 81 compare the analog displacement signals to obtain and compare the difference between the two displacement signals with the standard or reference signal R and when the difference of the displacement signals exceeds the reference signal, a digital signal of logic "1" is transmitted to the corresponding flip-flop circuits 86. Each flip-flop circuit records the passage of a signal from its comparator to retain a "memory" of which channels have exceeded the "failed" criteria and passes that signal through net 95 to two of the four AND gates in the voter. Since each displacement signal is compared three times, i.e. with each of the other three signals, the proper groupings of results from the comparators cause each AND gate to correspond with one channel. AND gate 91 receives signals resulting from a comparison of displacement signal A with each of the other displacement signals. Similarly, AND gate 92 receives a comparison of signal B; 93, signal C; and 94, signal M. Since AND gates 91, 92, 93, 94 transmit when all inputs are positive, the transmission of any particular AND gate is unique to the situation in which its basic displacement signal creates a difference greater than R when compared with each of the other three displacement signals. This amounts to a determination of a failed condition and a signal passing from an AND gate may be regarded as a "failed" signal.

The signals (again logic "1") passed by the AND gates are used to implement failure correction by isolating the failed channel and to indicate the fact of a failure. Isolation of channels 2, 4, 6 as a result of a failure sensed by an erratic displacement signal A, B, or C, is accomplished by NOR gate 102, 104, 106 turning off switch 103, 105, 107 to deactivate the solenoid 27, 47, 67 corresponding to the channel identified as having failed. NOR gates (producing a logic "0") are disclosed because of the symbolism of turning off that has attached although OR gates with current inversion or switch reversal could be used. Provision is also made for shutting down the entire system by means of a signal which represents the complete failure of the flight control system or of the main flight control computer. Such signal is applied through terminal 110 to each NOR gate where that signal would cause simultaneous deactivation of switches 103, 105, 107. Failure indication is provided by the "failed" signals as transmitted by the AND gates to OR gates 99, 100, 101 where transmission of that signal will cause operation of the appropriate warning lights 98 in warning indicator 96. The fourth light 97 receives its signal for illumination directly from AND gate 94 and when illuminated signifies a failure of the electronic actuator model. No OR gate is necessary in this instance because the OR gates with respect to channels 2, 4, 6 are to permit application of an alternate warning system. OR gates 99, 100, 101 are connected by leads 36, 56, 76 to pressure switches 37, 57, 77 which receive hydraulic pressure through lines 34, 54, 74 from center lock 5 where they are in contact with the hydraulic pressure existing in each of the lock pressure conduits 38, 58, 78. For this reason then, lights 98 will indicate failures either as detected by comparison of displacement signals or as sensed by loss of hydraulic pressure in the lock pressure conduits.

From this description of a typical embodiment of the invention it can be seen that failure of any channel will be accompanied by an indication of failure of that channel and in the case of failure in one of the actual working electro-hydraulic servoactuators will be accompanied by an immediate shutdown of that channel. The failure might occur in a channel having actual control or it may occur in a channel that is in standby status. If the failure occurs in the channel having control, control will be passed immediately to the next in line to receive it. Passing of control in these instances will probably cause an output ram motion and adjustment of control surfaces or aircraft attitude referred to as a transient. The number of transients occurring in this system in a sequence of failures depends on the order in which the channels would experience failure. The following chart indicating twenty-four possible failure sequences shows the number of transients for each sequential arrangement. It is noted that the average number of transients is considerably below what might be expected in the case of three failures in a dual failure correcting system. This lower number constitutes a recommendation of the system for aircraft stability.

| Failure sequence No. | First failure | Second failure | Third failure | Electronic model or remaining actuator | Number of transients |
| --- | --- | --- | --- | --- | --- |
| 1 | A | B | C | M | 3 |
| 2 | A | B | M | C | 2 |
| 3 | A | C | B | M | 2 |
| 4 | A | C | M | B | 1 |
| 5 | A | M | B | C | 2 |
| 6 | A | M | C | B | 1 |
| 7 | B | A | M | C | 1 |
| 8 | B | A | C | M | 2 |
| 9 | C | A | M | B | 1 |
| 10 | C | A | B | M | 2 |
| 11 | M | A | C | B | 1 |
| 12 | M | A | B | C | 2 |
| 13 | B | C | A | M | 1 |
| 14 | B | C | M | A | 0 |
| 15 | B | M | A | C | 1 |
| 16 | B | M | C | A | 0 |
| 17 | C | M | A | B | 1 |
| 18 | C | M | B | A | 0 |
| 19 | C | B | M | A | 0 |
| 20 | C | B | A | M | 1 |
| 21 | M | B | C | A | 0 |
| 22 | M | B | A | C | 1 |
| 23 | M | C | B | A | 0 |
| 24 | M | C | A | B | 1 |

We claim:
1. A flight control servoactuator having dual failure correcting redundancy comprising:
  (a) an actuator lever for attachment to the pilot valve of a control surface actuator;
  (b) first, second and third electro-hydraulic motor means for moving said lever responsive to a control signal, said three motor means each having force transmitting means connected to said level, means for selectively engaging and disengaging said second and third motor means, respectively, and each said motor means also having bypass means to permit placing of the motor means in a free riding condition;
  (c) electrical means attached to each said motor means for generating a displacement signal indicating the position of said lever as sensed by each said motor;
  (d) electronic model means also responsive to a control signal for generating a displacement signal indicating a standard result of said control signal;
  (e) electronic comparator and majority voting means for comparing each possible combination of said displacement signals and for producing a unique failed signal indicating failure in each of said motor means or said model means responsive to deviation of its displacement signal from the majority of the ones operating;
  (f) electrical indicating and disconnect means responsive to each said unique failed signal for indicating the motor or model means producing the divergent displacement signal and for activating the said bypass means on the motor means indicated to deactivate that motor means; and
  (g) each said means for selectively engaging and disengaging said second and third motor means being responsive to said bypass means of previously failed motor means whereby said first motor means normally moves said lever, and upon failure thereof and engagement of said selectively engaging means associated with said second motor means said second motor means moves said lever, and upon its failure and engagement of the selectively engaging means associated with the third motor means said third motor means moves said lever, so that only one motor means at a time drives said actuator lever.

2. The servoactuator of claim 1 further comprising:
  (h) said control signal being a different control signal for each said motor means and for said model means.

3. The servoactuator of claim 1 further comprising:
  (i) center lock means responsive to said bypass means of said motors for placing and locking said actuating lever in a predetermined position in response to the third successive said unique failed signal.

4. A servoactuator having multiple failure correcting redundancy comprising:
  (a) a lever for attachment to a mechanism to be activated;
  (b) multiple control channels of electro-hydraulic motor means for moving said lever responsively to command signals with one said motor means fixed to said lever for positive drive connection and means connecting each said motor means other than said one to said lever with lost motion;
  (c) deactivation means in each said control channel responsive to a failure signal for placing said motor of that control channel in bypass condition;
  (d) means responsive to deactivation of other motor means for locking each said motor means other than said one in positive drive connection with said lever;
  (e) electrical pick-off means on each said motor means for generating a displacement signal indicating movement of said lever as sensed by that motor means;
  (f) an electronic model channel responsive to command signals for generating a model displacement signal;

(g) electronic comparator and logic means responsive to said displacement signals for generating a failure signal for each said channel that fails and for conveying said failure signals to the corresponding control channels whereby successive failures of channels will take the failed channel out of operation, whereby one and only one control channel will positively drive said lever at any time and whereby the system can maintain undegraded performance through a number of channel failures equal to the number of channels minus two.

5. The servoactuator of claim 4 wherein each said means for locking each said motor means is responsive to deactivation of a particular combination of other motor means.

6. The servoactuator of claim 4 wherein said electronic comparator and logic means includes voter means for determining failures on the basis of deviation of a displacement signal from the majority of displacement signals.

7. The servoactuator of claim 4 further comprising:
(h) means for locking said lever in a predetermined position in response to a number of channel failures equal to the number of control channels.

8. A dual failure correcting electro-hydraulic servoactuator for a redundant flight control system comprising:
(a) an actuating lever for attachment to the pilot valve of a control surface actuator;
(b) a first, second, and third hydraulic motor each having a piston for moving said actuating lever;
(c) each said motor having an independent electrohydraulic net for driving each said motor responsively to an electrical command signal;
(d) each said net including "on-off" means responsive to a failure indicating signal for neutralizing said motor to effectively disconnect it from said lever;
(e) each said piston having electrical pick-off means for generating an electrical displacement signal indicating the position of said piston relative to its said motor whereby said first, second and third motors with their said nets, "on-off" means and pick-off means constitute three parallel actuating means;
(f) said second and third motors being free floating to permit said first motor to drive said lever and to cause said second and third motors to be active monitors;
(g) second motor locking means responsive to neutralization of said first motor for locking said second motor in a predetermined position to cause it to drive said lever;
(h) third motor locking means responsive to neutralization of both said first and second motors for locking said third motor in a predetermined position to cause it to drive said lever;
(i) an electronic actuator model also responsive to an electrical command signal for producing a displacement signal; and
(j) electronic comparator and logic circuitry including:
(1) six electronic comparators responsive to said four displacement signals and to a reference signal for comparing the difference between each possible combination of said displacement signals with said reference signal and for producing a digital signal indicating a difference in excess of said reference signal;
(2) six flip-flop circuits, one responsive to each said comparator, for recording and conducting each said digital signal;
(3) a majority voter including four AND gates each connected to a different combination of three of said six flip-flops so as to be responsive to a different set of three of said digital signals conducted by said flip-flop circuits wherein each said digital signal is applied to two AND gates each for producing a failure signal corresponding to failure of one of said parallel actuating means with its command signal, motor, net, pick-off means or of said actuator model as indicated by a divergence of one said displacement signal from the other said displacement signals; and
(4) an electronic "shut down" circuit responsive to each said failure signal corresponding to failure of one of said parallel actuating means for generating the said failure indicating signal to which the said "on-off" means of its corresponding net of the three nets is responsive;

whereby failure in any of the first, second or third parallel actuating means causes neutralization of that means, whereby a failure in said actuator model blocks further operation of said model, and whereby said servoactuator can withstand any two component failures with undegraded performance.

9. The servoactuator of claim 8 further comprising:
(k) four warning devices each responsive to one of said failure signals to create a warning signal to indicate a failure.

10. The servoactuator of claim 8 further comprising:
(l) center lock means responsive to neutralization of all three said motors for locking said lever in a predetermined position.

References Cited

UNITED STATES PATENTS

| | | | |
|---|---|---|---|
| 2,995,014 | 8/1961 | Horky et al. | 91—412 X |
| 3,095,783 | 7/1963 | Flindt | 91—363 X |
| 3,124,041 | 3/1964 | McMurtry et al. | 91—1 |
| 3,125,712 | 3/1964 | Meredith | 318—20.075 X |
| 3,190,586 | 6/1965 | Righton. | |
| 3,198,082 | 8/1965 | Kerris | 91—1 |
| 3,221,229 | 11/1965 | Kezer et al. | |
| 3,257,911 | 6/1966 | Garnjost et al. | 91—411 X |
| 3,270,623 | 9/1966 | Garnjost et al. | 91—411 X |
| 3,351,315 | 11/1967 | Carson et al. | |
| 3,358,565 | 12/1967 | Townsend | 91—411 |
| 3,422,327 | 1/1969 | McBrayer et al. | |
| 3,426,650 | 2/1969 | Jenney. | |

MARTIN P. SCHWADRON, Primary Examiner

I. C. COHEN, Assistant Examiner

U.S. Cl. X.R.

91—41, 363, 411; 244—77; 318—18